(12) United States Patent
Shinogi

(10) Patent No.: US 7,588,157 B2
(45) Date of Patent: Sep. 15, 2009

(54) IN-MOLD LABEL SYSTEM PLASTIC CONTAINER

(75) Inventor: Norikazu Shinogi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 414 days.

(21) Appl. No.: 10/561,353

(22) PCT Filed: Jun. 19, 2003

(86) PCT No.: PCT/JP03/07804

§ 371 (c)(1),
(2), (4) Date: Dec. 19, 2005

(87) PCT Pub. No.: WO2004/113180

PCT Pub. Date: Dec. 29, 2004

(65) Prior Publication Data

US 2006/0131306 A1    Jun. 22, 2006

(51) Int. Cl.
*B65D 6/02* (2006.01)
*B65D 1/42* (2006.01)

(52) U.S. Cl. .................................. 220/62.22; 220/657

(58) Field of Classification Search ............. 220/62.22, 220/62.17, 62.14, 62.12, 592.26, 592.2, 665, 220/662, 659, 657, 656, 62.11, FOR. 173, 220/FOR. 172, FOR. 127, 645; 206/505, 206/459.5; *B65D 81/34, 1/26; B29C 45/14; B32B 1/02*
See application file for complete search history.

(56) References Cited

U.S. PATENT DOCUMENTS

| | | | | |
|---|---|---|---|---|
| 1,907,797 A | * | 5/1933 | Halle | 206/15 |
| 1,955,851 A | * | 4/1934 | Heller | 206/445 |
| 3,169,689 A | * | 2/1965 | Schwartz | 229/400 |
| 3,171,539 A | * | 3/1965 | Holbrook et al. | 206/484.2 |
| 3,231,128 A | * | 1/1966 | Klein | 220/62.14 |
| 3,381,818 A | * | 5/1968 | Cope et al. | 206/524.2 |
| 3,382,136 A | * | 5/1968 | Bugel et al. | 428/215 |
| 3,391,823 A | * | 7/1968 | Tijms | 220/62.22 |

(Continued)

FOREIGN PATENT DOCUMENTS

EP    41713 A1 * 12/1981

(Continued)

OTHER PUBLICATIONS

European Search Report: PCT/JP0307804.

*Primary Examiner*—Anthony D Stashick
*Assistant Examiner*—Robert J Hicks
(74) *Attorney, Agent, or Firm*—Ladas & Parry LLP

(57) ABSTRACT

The main object is to provide an inmold labeled type plastic container which can be fabricated, even if there are some dimensional errors in the inmold label, with no damage to aesthetic design or no drop in yield is to be provided, and further an inmold labeled type plastic container which allows the consumer to drink or eat the content safely even if he or she brings his or her mouth into direct touch with the opening is to be provided. A bottom rim is disposed in the lower part of the inmold labeled type plastic container, with its dimension being not less than 0.3 mm but not more than 20 mm, and the inmold labeled type plastic container to be provided is labeled on its bottom rim in a similar way to the side part of the container.

7 Claims, 7 Drawing Sheets

U.S. PATENT DOCUMENTS

| | | | | |
|---|---|---|---|---|
| 3,685,734 | A * | 8/1972 | Paciorek et al. | 239/56 |
| 3,717,544 | A * | 2/1973 | Valyl | 220/62.22 |
| 3,776,375 | A * | 12/1973 | Rohdin | 206/459.5 |
| 3,776,413 | A * | 12/1973 | Myers | 220/62.14 |
| 4,289,817 | A * | 9/1981 | Valyi | 220/662 |
| 4,640,853 | A * | 2/1987 | Schmeal et al. | 428/34.2 |
| 4,909,411 | A * | 3/1990 | Uchida et al. | 220/62.22 |
| 5,193,265 | A * | 3/1993 | Muggli et al. | 29/527.4 |
| 5,257,709 | A * | 11/1993 | Okabe et al. | 220/62.22 |
| 5,804,270 | A * | 9/1998 | Kawamura et al. | 428/36.92 |
| 6,199,713 | B1 * | 3/2001 | de Vries | 220/495.02 |
| 6,341,712 | B1 * | 1/2002 | Huang | 220/663 |
| 2002/0150706 | A1 * | 10/2002 | Tachi et al. | 428/34.5 |
| 2003/0024162 | A1 * | 2/2003 | Weder | 47/72 |
| 2003/0196715 | A1 * | 10/2003 | Sakamoto et al. | 138/142 |

FOREIGN PATENT DOCUMENTS

| | | | |
|---|---|---|---|
| GB | 2122874 A | * | 1/1984 |
| JP | 05112351 A | * | 5/1933 |
| JP | 53058544 A | * | 5/1978 |
| JP | 57-64530 | | 4/1982 |
| JP | 59050931 A | * | 3/1984 |
| JP | 60-154216 | | 10/1985 |
| JP | 2-52712 | | 2/1990 |
| JP | 03197126 A | * | 8/1991 |
| JP | 7-137109 | | 5/1995 |
| JP | 8-132477 | | 5/1996 |
| JP | 8-197574 | | 8/1996 |
| JP | 9-174595 | | 7/1997 |
| JP | 11-105067 | | 4/1999 |
| JP | 2000-142747 | | 5/2000 |
| JP | 2000-177784 A | | 6/2000 |
| JP | 2000-178364 | | 6/2000 |
| JP | 2001-10677 | | 1/2001 |
| JP | 2002-211575 | | 7/2002 |
| JP | 2003-128037 | | 5/2003 |
| JP | 2003-170920 | | 6/2003 |

* cited by examiner (a)

(c)

(b)

(a)

(b)

IN-MOLD LABEL SYSTEM PLASTIC CONTAINER

TECHNICAL FIELD

The present invention relates to an inmold labeled type plastic container.

BACKGROUND ART

There are a variety of methods of labeling a side part of a plastic container including one by which the rear face of a label is glued and the label is stuck to the plastic container and another by which a seal type label to whose rear face an adhesive is already applied is stuck.

Among others, the inmold labeling system by which a label is inserted at the same time as molding of a plastic container to form the container and the label integrally has come to be frequently used in recent years. Since a plastic container formed by this inmold labeling system uses neither glue nor adhesive and accordingly its label and resin are melt-joined, the label does not come off even in a state of high temperature and high humidity. Therefore, such plastic containers are in very high demand for use in humid places such as bathrooms and toilets and as containers whose contents are to be used together with water, such as shampoo and detergent.

Furthermore, a container of the inmold labeling type, because of the absence of a level gap between the label and the container, can be designed to manifest aesthetic excellence as a whole, and many of this type are used as plastic containers for beverages and foods including juice, coffee and yoghurt.

DISCLOSURE OF THE INVENTION

However, where such an in mold labeling system was used, there arose a problem that the inmold label fitted within the female mold was shoved by molten resin, when it was extruded, to give rise to wrinkles or molten resin flowed into the gap between the female mold and the inmold label.

Such problems can be solved to some extent by eliminating dimensional fluctuations of the inmold label and fix to the inside of the female mold by some devices or other, but it is all but impossible to eliminate errors in every dimension of inmold labels which are mass-produced, and the installation of a label fixing device inside the female mold would complicate the fitting of the label in itself and invite a drop in yield, which is undesirable.

Incidentally, inmold labeled type plastic containers have aesthetic excellence (more specifically, this refers to characteristics that the whole container can be covered with a level, there is no level gap between the label and the plastic, and the label can be printed by gravure or offset process and accordingly can well represent the design) as mentioned above, and the inmold label can be given such functions as light interception and barriering, with the result that they are often used as cups for food, especially as beverage cups, and general consumers often would directly bring their mouths into touch with the openings of inmold labeled type plastic containers to drink or eat the contents.

Therefore, the opening of an inmold labeled type plastic container is required to be agreeable and safe to touch.

The main object of the present invention, attempted in view of these circumstances, is to provide an inmold labeled type plastic container which, even if there are slight dimensional errors in the inmold label, can be manufactured unaffected in aesthetic design or yield, and further to provide an inmold labeled type plastic container which allows the consumer to drink or eat the content even if he or she brings his or her mouth into direct touch with the opening.

In order to solve the problems noted above, the invention provides, as stated in Claim 1, an inmold labeled type plastic container fabricated by an inmold labeling type fabricating method by which molding of the container and labeling are accomplished at the same time by fitting an inmold label into a gap formed, where a female-metal mold and a male metal mold are used, by joining the female mold and male mold and injecting molten resin into the gap, the inmold labeled type plastic container being characterized in that a flange part is formed at the upper end of the side part of the container and with dimensions of 2 mm or more in flange width and 0.5 mm or more in flange thickness.

According to this invention, since the flange width of the flange part is 2 mm or more, it is made possible to make the seal sufficiently strong when the lid member to be stuck to the opening in the upper part of the container is to be sealed, and the user will feel nothing awkward even if he or she directly touches it with his or her own mouth. Also, as the flange thickness is not less than 0.5 mm, the flange part is enabled to bear the damage it is subjected to when the lid member is to be stuck.

Further, in order to solve the problems noted above, the invention provides, as stated in Claim 2, an inmold labeled type plastic container fabricated by an inmold labeling type fabricating method by which molding of the container and labeling are accomplished at the same time by fitting an inmold label into a gap formed, where a female metal mold and a male metal mold are used, by joining the female mold and male mold and injecting molten resin into the gap, the inmold labeled type plastic container being characterized in that a bottom rim is formed in the bottom part of the container, with a dimension of not less than 0.3 mm but not more than 20 mm, and the bottom rim is labeled in a similar way to the side part of the container.

According to this invention, since the bottom rim with a dimension of not less than 0.3 mm but not more than 20 mm is formed in the bottom part of the container and is labeled in a similar way to the side part of the container, when molten resin is injected from the part constituting the bottom of the container, the molten resin flowing from the bottom part to the side part flows not only toward the side part but also toward the bottom rim part, and is therefore prevented from being peeled off or flowing over the front surface of the label (between the inner surface of the female mold and the label).

Even if there is any error in the inmold label, as the container according to the invention has the bottom rim, the bottom rim performs the role of an "escape" to adjust the dimensional error, with the result that the container is unaffected in aesthetic design.

Further, the invention provides, as stated in Claim 3, an inmold labeled type plastic container fabricated by an inmold labeling type fabricating method by which molding of the container and labeling are accomplished at the same time by fitting an inmold label into a gap formed, where a female metal mold and a male metal mold are used, by joining the female mold and male mold and injecting molten resin into the gap, the inmold labeled type plastic container being characterized in that a flange part is formed at the upper end of the side part of the container, with dimensions of 2 mm or more in flange width and 0.5 mm or more in flange thickness, a bottom rim is formed in the bottom part of the container, with a dimension of not less than 0.3 mm but not more than 20 mm, and the bottom rim is labeled in a similar way to the side part of the container.

This invention can exert the actions and effects stated in Claims 1 and 2 at the same time.

In the inmold labeled type plastic container stated in Claim 2 or Claim 3, as stated in Claim 4, the relationships among the wall thickness (A) of the intersection between the bottom rim and the side part of the container, the wall thickness (B) of the side part of the container and the wall thickness (C) of the side part of the container may be $A \leqq 2 \times B$ and $A \leqq 2 \times C$.

This invention can provide an inmold labeled type plastic container which, when molten resin is injected, is free from peeling of the label during injection molding and floating of the label after the injection molding, and excels in aesthetic design.

The inmold labeled type plastic container stated in any of Claim 1 through Claim 3 may be fabricated, as stated in Claim 5, by using the female metal mold and the male metal mold which are a female metal mold and a male metal mold joined at the flange part in the formed container, and so designed that the flange width of a flange part formed by the female mold is smaller than the flange width of a flange part formed by the male mold.

When an inmold labeled type plastic container is to be formed by using a female metal mold and a male metal mold, a deviation may arise in assembling the metal molds (even if there is not deviation between the metal molds at the beginning, the metal molds become worn and may give rise to a deviation during the production of containers); if molten resin is injected to form a container in the presence of a deviation between metal molds, a level gap will occur in the deviated part, not only marring the aesthetic design but also causing the user to feel an awkward mouth touch when drinking from the container.

However, according to this invention, since fabrication uses the female metal mold and the male metal mold which are joined at the flange part in the formed container and so designed that the flange width of the flange part formed by the female mold is smaller than the flange width of the flange part formed by the male mold, even if the male mold and the female mold deviate from each other, the deviation can be concealed by the side part on the back of the flange (the face reverse to the face to which the lid member is to be stuck), with the result that neither the overall aesthetic design be marred nor the user is caused to feel an awkward mouth touch.

In the inmold labeled type plastic container stated in any of Claim 1 through Claim 3, the thickness of the label may be, as stated in Claim 6, kept not to exceed 150 μm.

When the thickness of the label increases, the width of the gap in which injected molten resin flows significantly differs between where the label is present and where it is absent, and this would inevitably invite a difference in the flowing velocity of the molten resin according to the presence or absence of the label. When a substantial difference in the flowing velocity of the molten resin occurs in this way, there will arise differences in the time taken by the resin to different parts of the container, and a so-called weld will occur in the flange part of the part where an earlier arriving part of the resin and a later arriving part of the resin meet, which might invite a fatal defect of splitting of the flange when the lid member is to be sealed.

However, according to the invention, since the thickness of the label is not more than 150 μm, there will arise no significant difference in the flowing velocity of the molten resin between where the label is present and where it is absent, with the result the occurrence of a so-called weld can be prevented.

In the inmold labeled type plastic container stated in any of Claim 1 through Claim 3, the label may be, as stated in Claim 7, a label having a configuration in which a plurality of thin films are stacked, the thin film positioned on the front face and the thin film positioned on the rear face consist of thin films of the same material, and further at least a resin film layer and a barrier layer having a defined strength or barrier layers having a defined strength are stacked between these thin films.

Also, as stated in Claim 8, the thin film positioned on the front face and the thin film positioned on the rear face of the label may consist of biaxially oriented polypropylene resin film layers or polyethylene resin film layers; the resin film layers having the defined strength may consist of biaxially oriented polyethylene terephthalate film layers, biaxially oriented polyamide film layers or biaxially oriented polypropylene film layers; and the barrier layers may consist of metal foil layers, vapor-deposited metal film layers or inorganic vapor-deposited oxide film layers.

By using such a label, the label can be prevented from curling when the container is formed, the label can be given a barriering function and, depending on the layer configuration of the label, the container can be made usable in a microwave oven.

Further the inmold labeled type plastic container stated in any of Claim 1 through Claim 3, the relationship between the fluid length (L) of the injected molten resin and the average wall thickness (t) of the container may be, as stated in Claim 9, $L/t \leqq 250$.

According to this invention, the pressure of the molten resin is sufficiently transmitted to the flange part to provide an inmold labeled type plastic container which is highly accurate and free from unintended unlabeling or wrinkling, and excels in aesthetic design.

BEST MODE FOR CARRYING OUT THE INVENTION

First, a molding method for inmold labeled type plastic containers common to all the aspects of the present invention will be described in specific terms with reference to drawings, followed by specific description of characteristic parts of the invention with reference to the drawings. Incidentally, the inmold labeled type plastic container according to the invention has its major characteristic in its bottom rim and flange part, and therefore in the following description the bottom rim will be considered a first characteristic feature and the flange part a second characteristic feature of the invention.

[1] Method of Forming the Inmold Labeled Type Plastic Container

Figure 1:
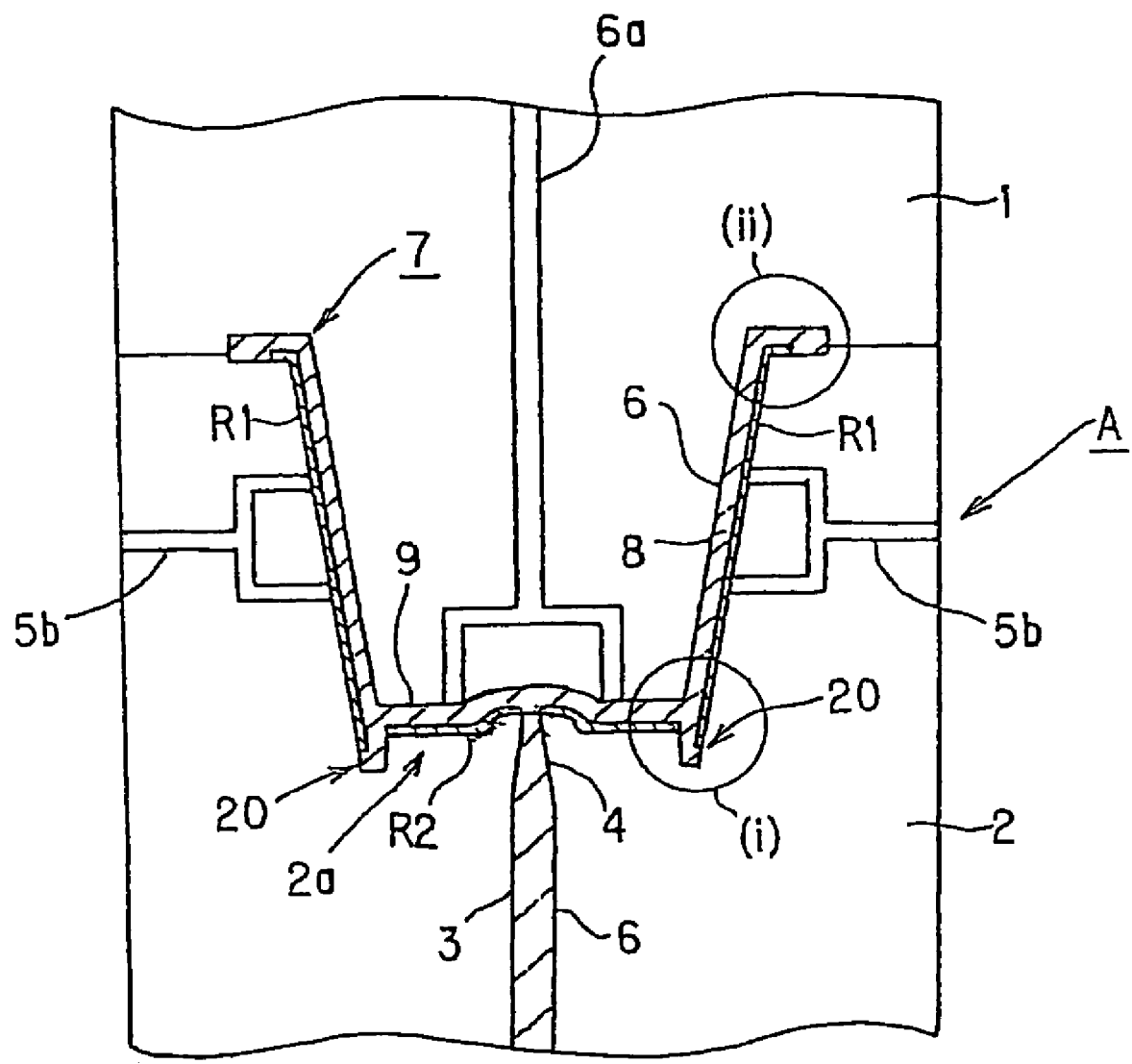
FIG. 1 is a schematic illustrative diagram for describing one example of molding method for the inmold labeled type plastic container according to the present invention.

FIG. 1 is a schematic illustrative diagram for describing one example of molding method for the inmold labeled type plastic container according to the invention. Incidentally, the molding method shown in FIG. 1 merely shows one typical example, but is nothing to limit the method of molding the inmold labeled type plastic container according to the invention.

A molding method of an inmold labeling system for molding the inmold labeling type plastic container according to the invention means a method of simultaneous labeling with the molding of a container using female and male metal molds, by which an inmold label is fitted within a gap resulting from the joining of the female mold and the male mold and then molten resin is extruded into the gap, more specifically a method such as the one shown in FIG. 1. Thus, it uses an metal mold for injection molding comprising a male metal mold 1 (hereinafter sometimes referred to as simply "male mold"), a female metal mold 2 (hereinafter sometimes referred to as simply "female mold"), a runner 3, a gate opening 4, a vacuum suction device 5$a$ fitted to the male mold 1, vacuum suction devices 5$b$ and 5$b$ fitted to the female mold 2 and so forth; first, a label R1 for the side part is so fitted onto the inner wall surface of the female mold 2 as to be tightly stuck to a position corresponding to the whole outer wall surface of the side part of the molded container while fixing it by vacuum suction utilizing the vacuum suction devices 5$b$ and 5$b$ and the like, and similarly a label R2 for the bottom part is so fitted onto the surface in a position corresponding to the bottom part of the male mold 1 while fixing it by vacuum suction utilizing the vacuum suction device 5$a$. Then, the male mold 1 is fixed to the female mold 2; after that, molten resin 6 is injected from the gate opening 4 with a heating cylinder (not shown) into the gap formed by the female mold 2 and the male mold 1 by way of the runner 3 to form a container 7 matching the shape of the gap and to tightly adhere the label R1 for the side part and the label R2 for the bottom part in a molten-integrated form to all over the outer wall surface of the body part an all over the inner bottom wall surface of the bottom constituting that container 7; after that the molded product, which has been hardened by cooling, is taken out, thereby enabling the inmold labeled type molded container according to the invention to be produced.

And, first the inmold labeled type plastic container 7 according to the invention formed by this method is characterized in that the relationship between the fluid length L of the injected molten resin and the average wall thickness 5 (not shown) of the container 7 is L/t≦250.

By keeping the fluid length L of the molten resin 6 and the average wall thickness 5 of the container 7 in such a relationship, the pressure of the molten resin is sufficiently transmitted to the flange part to obtain an inmold labeled type plastic container which is highly accurate and free from unintended unlabeling or wrinkling, and excels in aesthetic design.

[2] First Characteristic Feature of the Inmold Labeled Type Plastic Container

Figure 2:
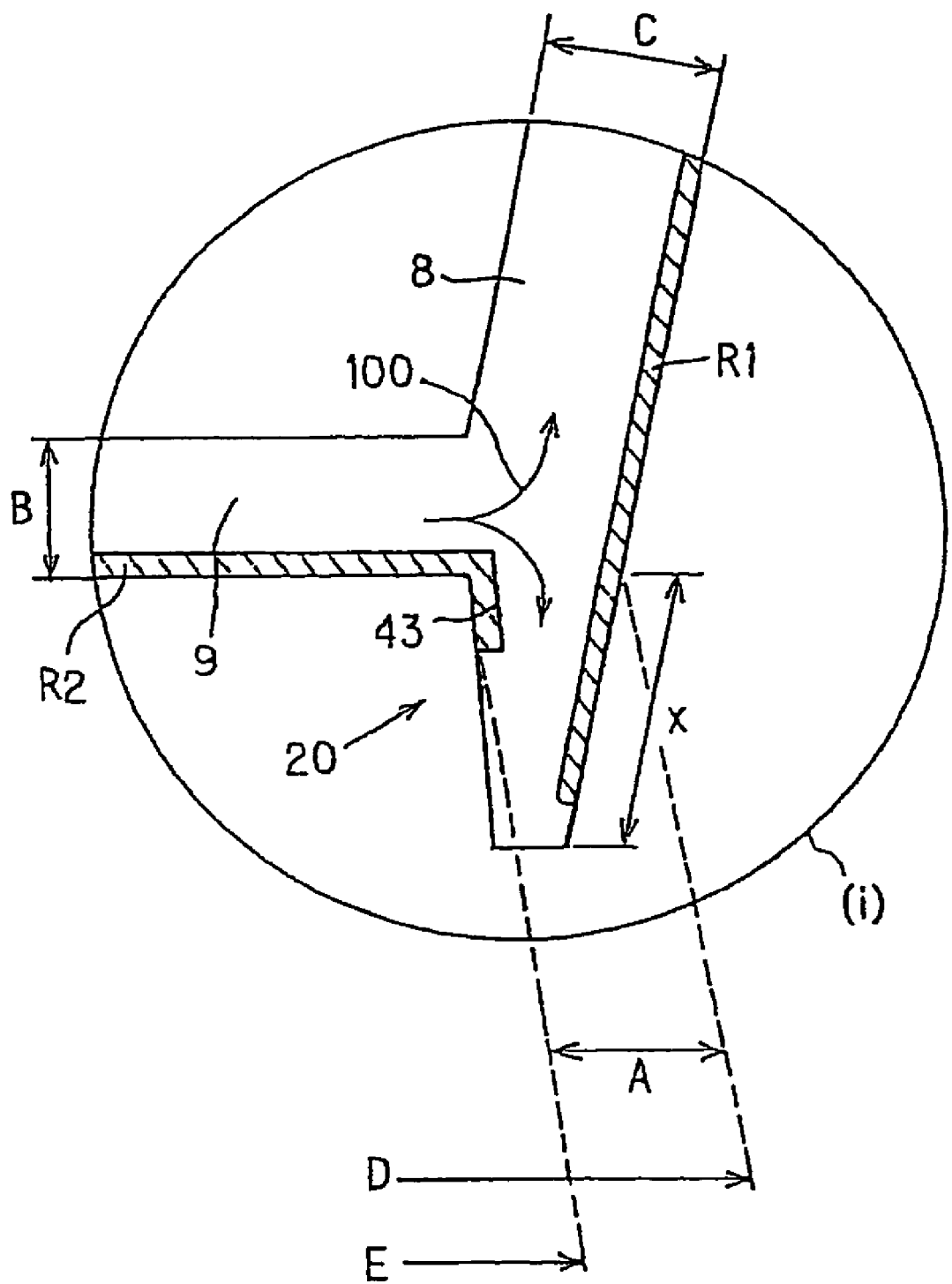
FIG. 2 is a diagram for describing the inmold labeled type plastic container in a mode for carrying out the invention, and more specifically a diagram showing an enlarge section of a bottom rim 20 (sign (i) in FIG. 1)

FIG. 2 is a diagram for describing the inmold labeled type plastic container 7 in a mode for carrying out the invention formed by the inmold labeled type plastic container molding method shown in FIG. 1, and more specifically a diagram showing an enlarge section of a bottom rim 20 (sign (i) in FIG. 1).

As shown in FIG. 2, the bottom rim 20 is formed in the lower part of the inmold labeled type plastic container 7 according to the invention and, with its dimension x being not less than 0.3 mm but not more than 20 mm, the bottom rim too is characterized by being labeled with a label R1 similar to that on the-container's side part 8.

Setting the dimension x of the bottom rim 20 not less than 0.3 mm but not more than 20 mm and labeling it with the label R1 similar to that on the container's side part 8 as in the present invention causes the molten resin to be fluid as indicated by arrow 100 in the diagram prevents the molten resin from flowing over the surface of the label R1.

The reason is that, if the dimension x of the bottom rim 20 is shorter than 0.3 mm (the bottom rim 20 is absent), the tip portion of the label R1 will be positioned in the vicinity of the joint portion between the container's side part 8 and the container's bottom part 9, the molten resin will flow over the surface of the label R1 at the time of molding and adversely affect the aesthetic design of the container 7. On the other hand, if the dimension x of the bottom rim 20 is longer than 20 mm, there will be no problem in its relationship to the label R1, but eventually the wall thickness (a) of the intersection between the bottom rim 20 and the container's bottom part 9 will increase, sometimes giving rise to a problem, such as the label coming off in the container after injection molding.

The inmold labeled type plastic container 7 according to the invention is also characterized by relationships of A≦2×B and A≦2×C among the wall thickness (a) of the intersection between the bottom rim 20 and the container's bottom part 9, the wall thickness (b) of the container's bottom part and the wall thickness (c) of the container's side part.

By keeping the above-stated relations among these wall thicknesses, the flow of the molten resin can be smoothened, with the result that the labels R1 and R2 from coming or floating.

It is preferable for the wall thickness (a) of the intersection to be in a range of 1.0 to 3.0 mm, and 1.5 mm is particularly preferable in this range. It is preferable for the wall thickness (b) of the container's bottom part to be in a range of 0.5 to 1.5 mm, and 1.0 mm is particularly preferable in this range. Further, it is preferable for the wall thickness (c) of the container's side part to be in a range of 0.5 to 1.5 mm, and 0.7 mm is particularly preferable in this range.

[3] Second Characteristic Feature of the Inmold Labeled Type Plastic Container

Figure 3:
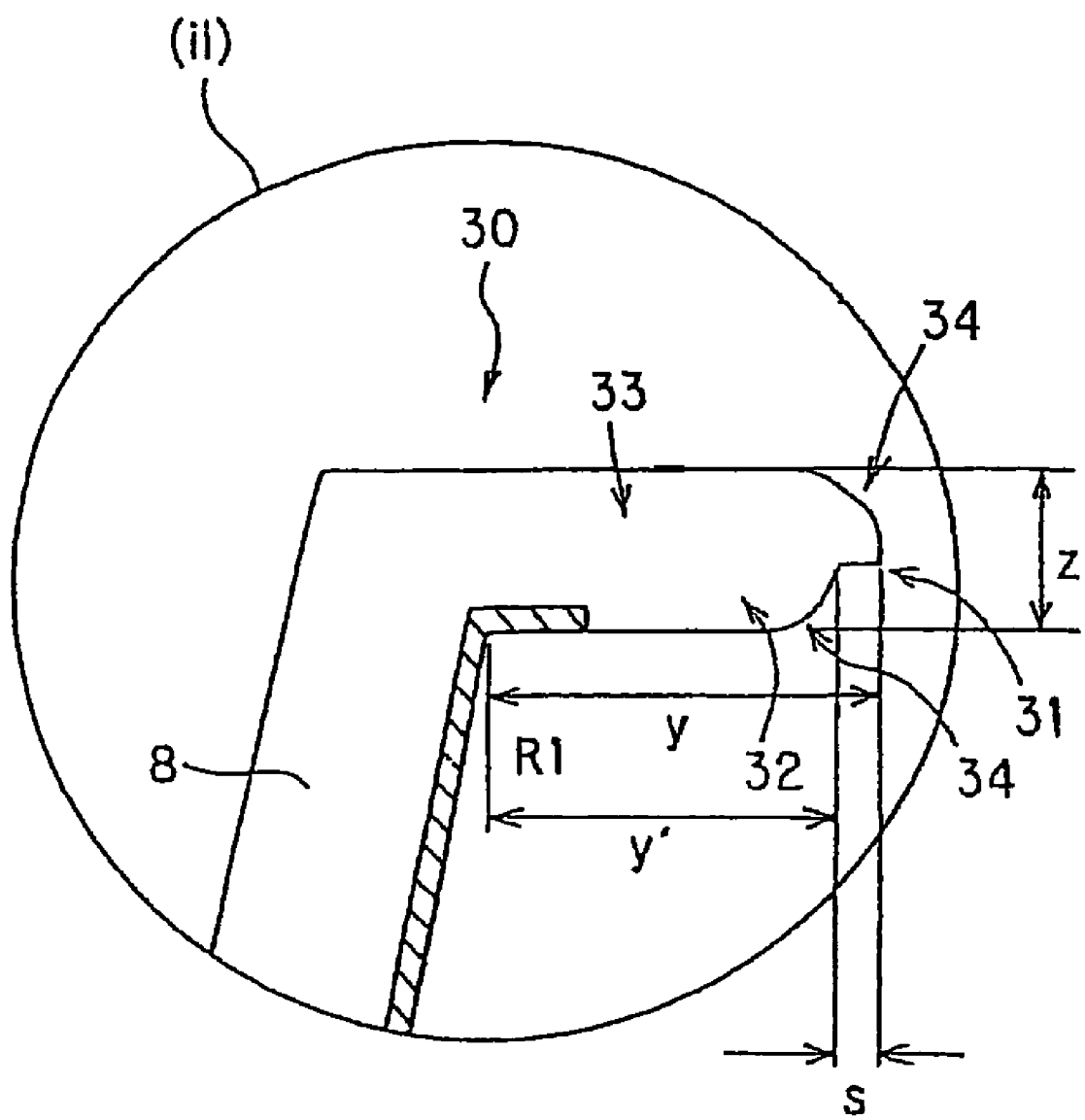
FIG. 3 is a diagram for describing the inmold labeled type plastic container in another mode for carrying out the invention, and more specifically a diagram showing an enlarged section of a flange part 30 (sign (ii) in FIG. 1)

FIG. 3 is a diagram for describing the inmold labeled type plastic container 7 in another mode for carrying out the invention formed by the inmold labeled type plastic container molding method shown in FIG. 1, and more specifically a diagram showing an enlarge section of a flange part 30 (sign (ii) in FIG. 1).

As shown in FIG. 3, the inmold labeled type plastic container 7 according to the invention has the flange part 30 formed at the upper end of its side part 8, and is characterized by its dimensions which are not less than 2 mm in flange width y and not less than 0.5 mm in flange thickness z.

By setting the flange-width y of the flange part 30 to not less than 2 mm as in the present invention, it is made possible to make the seal sufficiently strong when the lid member to be stuck to the opening part of the container 7 is to be sealed, and the user will feel nothing awkward even if he or she directly touches it with his or her own mouth. According to the invention, no particular upper limit is prescribed to the flange width y of the flange part 30, and the width can be set as desired. However, considering the case in which the user directly drinks or eats the content with his or her mouth in direct contact with the container 7, too great a width would not be preferable;.in specific terms about 2.0 mm is preferable, and a width greater than 10.0 mm would pose an obstacle and therefore be undesirable when the content is to be drunk or eaten.

Also, by setting the flange thickness z to not less than 0.5 mm as in the invention, the flange part is enabled to bear the damage it is subjected to when the lid member is to be sealed. The invention prescribes no particular upper limit to this flange thickness z either, and the thickness can be set as desired. However, considering the case in which the user directly drinks or eats the content with his or her mouth in direct contact with the container 7, too great a thickness would conceivably make him or her feel awkward, and therefore about 1.0 mm is preferable.

Further, the inmold labeling type plastic container 7 according to the invention is characterized in that the female mold 2 and the male mold 1 are joined at the flange part 30 in the formed container 7 (see reference sign 31 in FIG. 3), and the container is fabricated by using the female mold 2 and the male mold 1 so designed that the flange width y' of a flange part 32 formed by the female mold 1 is smaller than the flange width y of a flange part 33 formed by the male mold 1.

The use in this way of the female mold 2 and the male mold 1 so designed that the flange width y' of the flange part 32 formed by the female mold 1 is smaller than the flange width y of the flange part 33 formed by the male mold 1 results in the formation of the lower side of the flange shown in FIG. 3 (reference 'sign 32) in a smaller size, even if any deviation, either back and forth or right and left, arises between the female mold 1 and the male mold 2, the lower side 32 of the flange will not protrude, with the result that the overall aesthetic design of the container 7 is not adversely affected.

In this case, though the metal molds will be so designed as to create an intentionally disposed level gap S on the flange part 30 as shown in FIG. 3, the lower side 32 of the flange is invisible when viewed from above the container, and accordingly no problem will arise; the user is likely to have no awkward feeling even when his or her mouth is brought into direct touch with the flange.

The dimension of the level gap S intentionally disposed to tolerate the deviation arising when the metal molds are combined, if it is substantially equal to the deviation arising when the metal molds are combined, can be set as desired according to the accuracy of the formation apparatus that is actually used. If it is a usual formation apparatus for inmold labeled type plastic containers, the dimension of S will be sufficient if it is set to about 0.05 mm.

Further at the reference 31 of the flange part 30 of the container 7 according to the invention, its tip 34 may as well be rounded as illustrated because the female mold 2 and the male mold l are combined.

[4] Other Characteristic Features

Other characteristic features of the inmold labeling type plastic container according to (various modes for carrying out) the present invention will be described in specific terms.

(Molten Resin)

First, as the molten resin 6 for use in molding the container 7 according to the invention as described above, one of various polyethylene resins for molding use such as high density polyethylene, medium density polyethylene, low density polyethylene or some other kind, polypropylene, polystyrene, polyethylene terephthalate, polycarbonate or the like can be used.

(Labels)

On the other hand, for the label R1 for the side part and the label R2 for the bottom part for use in molding the inmold labeled type plastic container 7 according to the invention as described above, there is no particular restriction if the thickness is not greater than 150 μm, any of all the already known in mold label shaving various functions can be used for the purpose.

However, it is preferable to use as labels for the inmold labeled type plastic container according to the invention labels each having a configuration in which a plurality of thin films are stacked, the thin film positioned on the front face and the thin film positioned on the rear face consist of thin films of the same material, and further at least a resin film layer and a barrier layer having the defined strength or barrier layers having the defined strength are stacked between these thin films; it is further preferable that the thin film positioned on the front face and the thin film positioned on the rear face of the label consist of biaxially oriented polypropylene resin film layers or polyethylene resin film layers, the resin film layers having the defined strength consist of biaxially oriented polyethylene terephthalate film layers, biaxially oriented polyamide film layers or biaxially oriented polypropylene film layers, and the barrier layers consist of metal foil layers, vapor-deposited metal film layers or inorganic vapor-deposited oxide film layers.

As materials to constitute the thin films positioned on the front face and the rear face of the label, for instance one of various polyethylene resins for molding use such as high density polyethylene, medium density polyethylene, low density polyethylene, linear (straight chain) polyethylene or some other kind, polypropylene resins, polyester resins, polyamide resins or some other resin films or sheets. Among the aforementioned polyethylene resins, co-extruded films or sheets of these resins can also be used. As films or sheets of the aforementioned resins, unoriented or oriented films oriented in the monoaxial or biaxial direction can be used, and their desirable thickness is about 6 to 100 μm, more preferably about 12 to 50 μm. By configuring in this way the thin film positioned on the front face and the thin film positioned on the rear face of the label consist of thin films of the same material, the fabricated label can be prevented from curling. Further, it is desirable to use as the material to constitute the thin film positioned on the rear face of the label a heat-sealable material which has a property, when the polyethylene resin for molding use constituting the container is injected and extruded to come into contact with it, to melt together and tightly adhere to each other; it is desirable to use as the material to constitute the thin film positioned on the front face of the label a material which can keep the resilience, strength and other characteristics of the label, more desirably what has a rigidity of 5.000 Kg/cm2 in Young's modulus.

Next, as materials for the resin film layers having the defined strength to constitute part of the label according to the invention, for instance polyester resin (polyethylene terephthalate resin), polyamide resin, polyaramid resin, polypropylene resin, polycarbonate resin, polyaracetal resin or some other tough resin films or sheets can be used. And film or sheet of any of the resins stated above performs a function of further reinforcing the function of the material constituting the aforementioned outermost layer, and preferably should have, for instance, rigidity and be excellent in mechanical, physical, chemical and other properties. It is preferable to use as the aforementioned resin films or sheets oriented films oriented in biaxial directions. Further according to the invention, the thickness of the resin films or sheets need not be greater than the minimum required to provide them with sufficient strength, rigidity and other properties; too great a thickness would entail a disadvantage of boosting the label cost or, conversely, too small a thickness would entail poor strength, rigidity and other properties and therefore be undesirable.

According to the present invention, it is preferable for the reasons stated above to use a thickness of about 10 μm to 50 μm, most desirably about 12 μm to 25 μm.

Then, as materials for the barriering base layer to constitute part of the label, a material having a property to intercept light including sunlight or a material having a property not to allow permeation of water vapor, water, gas or the like can be used, and this may be a single-component base material, a composite base material combining two or more kinds of base materials, or the like. More specifically, what can be used may be, for instance, an aluminum foil having light-intercepting and barriering properties or a resin film on which such a foil is vapor-deposited, a resin film having a vapor-deposited film of an inorganic oxide such as silicon oxide having a barriering property or aluminum oxide, a resin film or sheet of low density polyethylene, medium density polyethylene, high density polyethylene, straight chain low density polyethylene, polypropylene, ethylene-propylene copolymer or the like, a resin film or sheet having a gas-barriering property of polyester resin, polycarbonate resin, nylon resin (polyamide resin), acryl nitrile resin, polyvinyl alcohol, saponified ethylene-acetic vinyl copolymer or the like, or a film or sheet of one or another of various colored resins, which have a property to intercept light, formed by adding a coloring agent such as a pigment augmented with a desired additive or the like to the resin, and mixing and kneading them into a film. Any one of these materials singly or in combination with another or more can be used. Any of the aforementioned resin films or sheets may have any desired thickness, but it is usually about 6 μm to 100 μm, and more preferably about 7 μm to 30 μm. Further in the foregoing, an aluminum foil of about 6 μm to 50 μm in thickness or a resin film on which an aluminum foil is vapor-deposited of about 100 Å to 1000 Å in thickness can be used. As a resin film to support the aforementioned vapor-deposited film, for instance a polyester film, polyamide film, polyolefin film, polycarbonate film, polyvinyl alcohol film, saponified ethylene-acetic vinyl copolymer film or some other film can be used.

Incidentally, since a label is usually placed under severe conditions both physically and chemically, the laminated materials to constitute the label are subject to stringent requirements regarding strength against deformation, strength against drop impact, resistance to pin holes, thermal resistance, sealing performance, qualitative stability, working ease, sanitariness and in other respects, and for this reason other materials satisfying these conditions can be used as desired besides the materials enumerated above; they can be selected from the films or sheets of, for instance, low density polyethylene, medium density polyethylene, high density polyethylene, linear low density polyethylene, polypropylene, ethylene-propylene copolymer, ethylene-acetic vinyl copolymer, monomer resin, ethylene-ethyl acrylate copolymer, ethylene-acrylic acid copolymer or methacrylic acid copolymer, methyl pentene polymer, polybutene resin, vinyl polychloride resin, vinyl polyacetate resin, polyvinylidene chloride resin, vinyl chloride-vinylidene chloride copolymer, poly(meta)acryl resin, polyacryl nitrile resin, polystyrene resin, acrylonitrile-styrene copolymer (AS resin), acrylonitrile-butadiene-styrene copolymer (ABS resin), polyester resin, polyamide resin, polycarbonate resin, polyvinyl alcohol resin, saponified ethylene-acetic vinyl copolymer, fluorine resin, diene resin, polyaracetal resin, polyurethane resin, nitrocellulose and other known resins. Besides them, for instance films such as cellophane or synthetic paper or the like can also be used. In the present invention, the aforementioned resin films or sheets can be used unoriented or oriented in uniaxial or biaxial directions. Their thickness can be selected as desired from a range of about a few μm to 150 μm and used. Further according to the invention, the resin films or sheets may be in any state, such as extruded film, inflation film or coating film.

Next to describe the fabrication method for the above-mentioned laminated materials to be stacked to fabricate a label according to the invention, applicable methods include one or another of laminating methods for use in fabricating a usual wrapping material including, for instance, the extrusive laminate method, sand laminate method, co-extrusion laminate method, dry laminate method, solvent-free dry lamination method or some other method. And in performing the above-described lamination according to the invention, for instance, pretreatment such as corona treatment, ozone treatment or frame treatment can be applied to the film and, for example, one or another of isocyanate (urethane), polyethylene imine, polybutadiene, organic titanium and other anchor coating agents, or one or another of known anchor coating agents, adhesives and the like including polyurethane, polyacryl, polyester, epoxy, vinyl polyacetate, cellulose or some other adhesive for use with laminates can be used.

Incidentally, in any of the above-mentioned fabrication methods for laminated materials to be stacked to fabricate a label according to the invention, as an adhesive extrusion resin to constitute the adhesive layer in performing extrusion lamination, for instance any of polyethylene, ethylene-(-ethyl acrylate copolymer, polypropylene, polybutene, polyisobutene, polyisobutylene, polybutadiene, polyisoprene, ethylene-methacrylic acid copolymer, copolymers of ethylene and unsaturated carbonic acid such as ethylene-acrylic acid copolymer or acid-denatured polyolefin resin obtained by denaturing one or another of them, ethylene-ethyl acrylate copolymer, ethylene-methyl acrylate copolymer, ionomer resin, ethylene-vinyl acetate copolymer or the like can be used. Further, as the adhesive to constitute the adhesive layer for dry lamination according to the invention, in specific terms a two-part hardening type urethane adhesive used in dry lamination or the like, polyester urethane adhesive, polyether urethane adhesive, acryl adhesive, polyester adhesive, polyamide adhesive, vinyl polyacetate adhesive, epoxy adhesive, rubber adhesive or some other adhesive can be used.

Next will be described the shape of the label for use in the inmold labeled type plastic container according to the invention.

Figure 4:
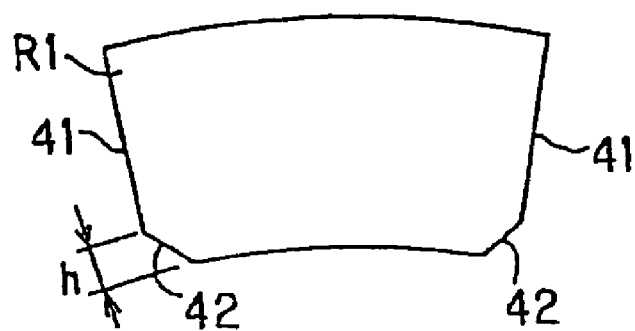
In FIGS. 4, (a) and (b) show front views of a label for use on the side part and (c) shows a front views of a label for use on the bottom part.
Figure 4:
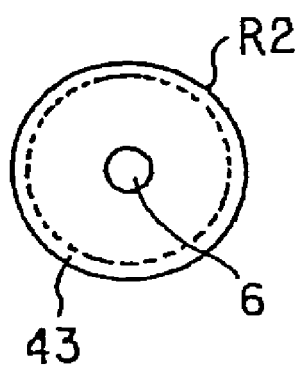
Figure 4:
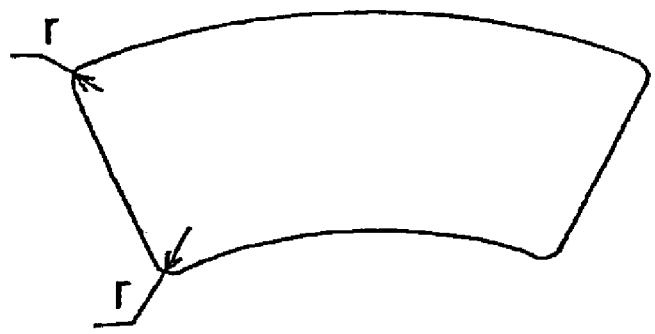

FIGS. 4(a) and (b) show front views of the label R1 for the side part and FIG. 4(c), a front view of the label R2 for the bottom part.

As shown in FIG. 4(a), the label R1 for the side part is in a fan shape, and cuts 42 and 42 may be formed in lower parts of two side edges 41 and 41 of the label R1 for the side part. These cuts 42 and 42, at their maximum length, extend to the parts of the side part 8 (see FIG. 1) matching the bottom rim 20, and as a result the height h of the cuts 42 and 42 also is substantially equal to the distance from the bottom end of the label R1 for the side part to the top end of the bottom rim 20.

By providing the label R1 for the side part with the cuts 42 and 42 in this way, when the label R1 for the side part is fitted into the female metal mold 2, the lower parts of the two side edges 41 and 41 of the label R1 for the side part are prevented from coming into contact with the protruding portion 2a of the female metal mold 2 (see FIG. 1), which would peel off the lower part of this label R1 for the side part. For this reason, there is no possibility for the injected resin 6 to be caused to flow outside the label R1 for the side part by the peeling-off of the label R1 for the side part, and instead the label R1 for the side part can be arranged in its due position outside the side part 8.

On the other hand, the label R1 for the side part is in a fan shape as shown in FIG. 4(b), and its four corners may form curved cuts. In this case, the cuts 42 need not be formed. The reason is that, by forming the four corners of the label R1 for the side part in a curved form, even if it comes into contact with the protruding portion 2a of the metal mold 2 (see FIG. 1), the label R1 will slide and reach its regular position.

Also, as shown in FIG. 2, the diameter of the label R2 for the bottom part may be smaller than the outer diameter D of the side part 8 on the plane of arrangement of the label R2 for the bottom part and greater than the outer diameter E of the bottom part 9 on the plane of arrangement of the label R2 for the bottom part. Thus, a relationship of E<the diameter of the label R2 for the bottom part □ D can be adopted. Further, it is preferable for the periphery 43 (see FIG. 4(c)) of the label R2 for the bottom part to protrude outward from the bottom part 9 and to descend.

By setting the diameter of the label R2 for the bottom part larger than the outer diameter E of the bottom part 9 in this way, when the label R2 for the bottom part is fitted into the female metal mold 2 (see FIG. 1), even if the label R2 for the bottom part somewhat deviates, the bottom part 9 of the container 7 can be sufficiently covered by the label R2. As a result, the gas,barriering and other functions of the bottom part 9 can be enhanced. Also, by setting the diameter of the label R2 for the bottom part smaller than the outer diameter D of the side part 9, the injected resin 6 can be let smoothly flow around the bottom rim 20.

Also, in the inmold labeling type plastic container 7 according to the invention shown in FIGS. 1 through 3 for instance, the label R2 for the bottom part need not be used in every case, and its use can be dispensed with where it is unnecessary (for instance where the container's bottom part requires no aesthetic design or the container's bottom part needs no gas barriering).

(Lid Member)

One or another of various known materials can be used as the material of the lid member for sealing the inmold labeling system type plastic container according to the invention. More specifically, any film or sheet of polyester resin, polyamide resin, polyaramid resin, polypropylene resin, polycarbonate resin, polyaracetal resin, fluorine resin or some other tough resin, or of various paper base materials can be used. As films or sheets of the aforementioned resins, unoriented or oriented films oriented in the uniaxial or biaxial direction can be used. Also, like the aforementioned inmold labels R1 and R2, the lid member can be formed in a laminated structure. For instance, where the lid member is to be provided with a property to intercept light including sunlight or a material having a property not to allow permeation of water vapor, water, gas or the like, materials having such properties can be stacked; what can be used maybe, for instance, an aluminum foil having light-intercepting and barriering properties or a resin film on which such a foil is vapor-deposited, a resin film with a barriering property having a vapor-deposited film of an inorganic oxide such as silicon oxide or aluminum oxide, a resin film or sheet of low density polyethylene, medium density polyethylene, high density polyethylene, straight chain low density polyethylene, polypropylene, ethylene-propylene copolymer or the like, a resin film or sheet having a gas-barriering property of polyester resin, polycarbonate resin, nylon resin (polyamide resin), acryl nitrile resin, polyvinyl alcohol, saponified ethylene-acetic vinyl copolymer or the like, or a film or sheet of one or another of various colored resins having a barriering property such as water formed by adding a coloring agent such as a pigment augmented with a desired additive or the like to the resin and mixing and kneading them into a film.

The foregoing description refers to only one mode for implementing the inmold labeled type plastic container according to the invention, and therefore the invention is not limited by the foregoing description, but can be adapted to various purposes according to the way in which the container is to be used.

(For Microwave Oven (Retort Food) Use)

The inmold labeled type plastic container according to the invention can be suitably used as a container applicable to microwave ovens, and in this case the flange part can as well be shaped not only as shown in FIG. 3 but also as shown in FIGS. 5(a) and (b).

As shown in FIG. 5(a), a seal protruding part 50 is disposed on the upper face of the flange part 30 and a reinforcing protruding part 51 hanging from the outer tip of the flange part 30 may also be provided. Incidentally, the seal protruding part 50 need not be provided in some cases. Also, as shown in FIG. 4(b), the flange part 30 may be inclined downward at a fixed angle α° to a horizontal line 52, which is an extension of a horizontal line linking the opening of the container and indicated by a dotted line. It is preferable for this fixed angle α to be about 1° to 10° and more preferably 2° to 5°. Such a flange part facilitates the opening and closing of the container, and therefore is suitable for a container whose content is to be a retort food compatible with a microwave oven.

Figure 6:
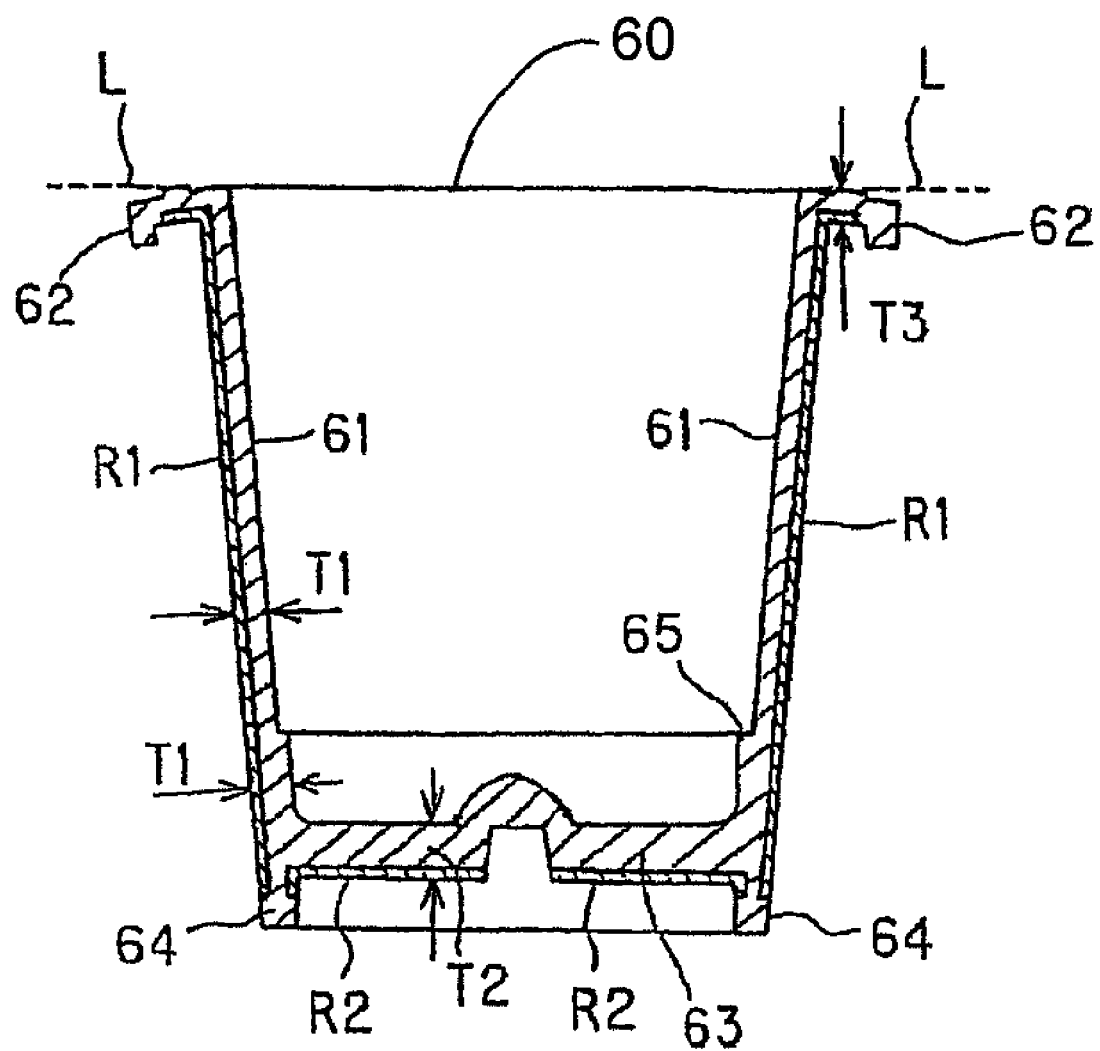
FIG. 6 shows a sectional view of the inmold labeled type plastic container according to the invention where its content is to be a retort food compatible with a microwave oven.

FIG. 6 shows a sectional view of the inmold labeled type plastic container according to the invention where its content is to be a retort food compatible with a microwave oven.

Figure 5:
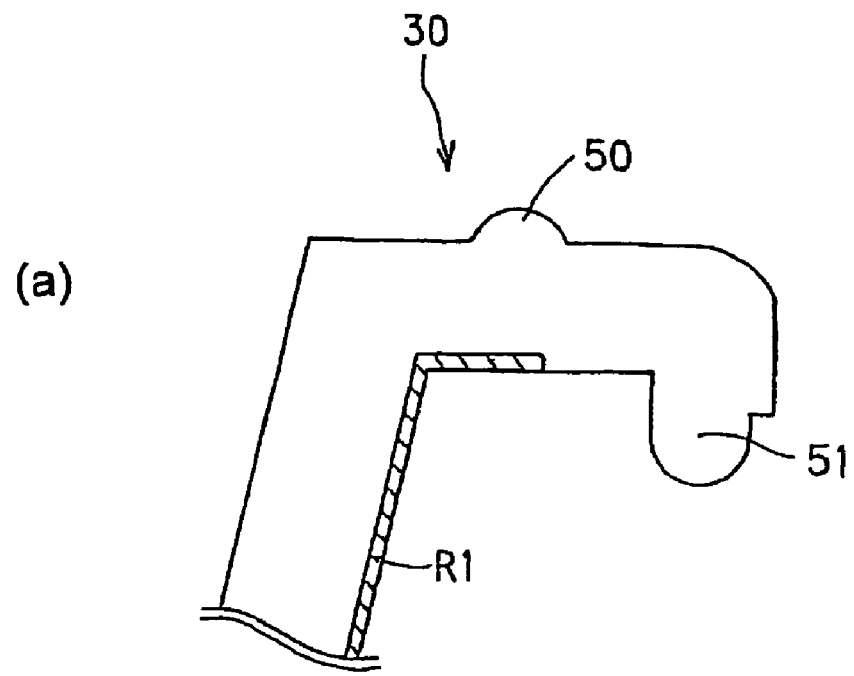
FIG. 5 show enlarged sectional views of the shape of a flange part in the inmold labeled type plastic container according to the invention.
Figure 5:
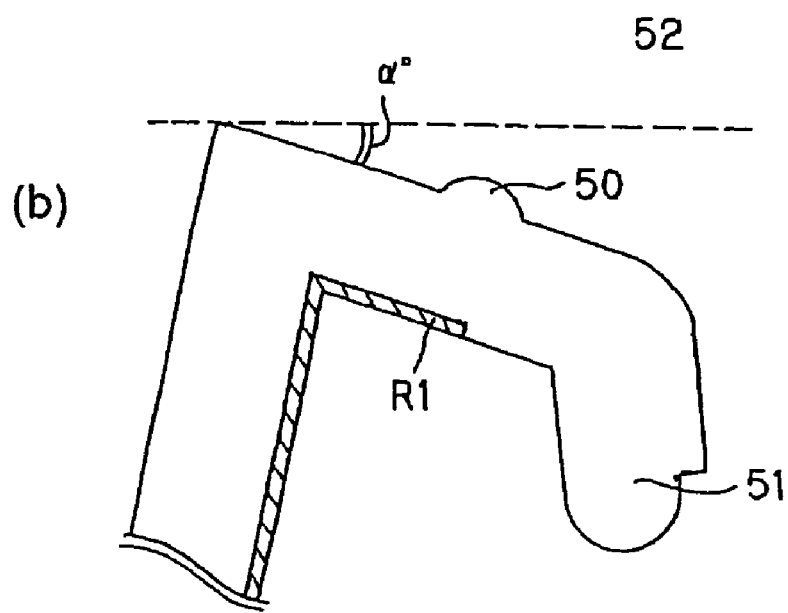

As shown in FIG. 6, a container body 60 comprises a circumferential side wall part 61 constituting the barrel of the container, a flange part 62 continuous outward from the top end of the circumferential side wall part 61, a bottom wall part 63 continuous laterally from the bottom end of the circumferential side wall part 61, and a bottom rim 64 continuous in the perpendicular direction from the bottom end part of the circumferential side wall part 61. Incidentally, the flange part 62 has a configuration in which the flange part 62 constituting the container body 60 is inclined downward from the horizontal line indicated by dotted line L from the top end of the circumferential side wall part 61 and is continuous outward as shown in FIG. 5.

In such an inmold labeled type plastic container 60 for retort food use, an annular stacking rib 65 can be disposed on the inner circumferential face of the circumferential side wall part 61 constituting the container body 60. And according to the invention, by disposing the annular stacking rib 65 as stated above, it is made possible to stack such containers 60 and provides a reinforcing effect to increase the strength of its barrel. A container to contain a retort food and to be applied to a microwave oven requires a certain strength (namely it has to bear retorting or boiling); further with a view to ensuring a sufficient drop strength and other properties required of the container, regarding the wall thicknesses of the circumferential side wall part 61, the flange part 62 and the bottom wall part 63 constituting the container body 60, it should desirably be such a container injection molded with adjustment to keep the wall thickness T1 of the circumferential side wall part 61 in a range of 0.6 to 1.2 mm, the wall thickness T2 of the bottom wall part 3, 0.7 to 1.3 mm, and the wall thickness T3 of the flange part 62, 0.9 to 1.5 mm.

(What has no Bottom Rim)

Figure 7:
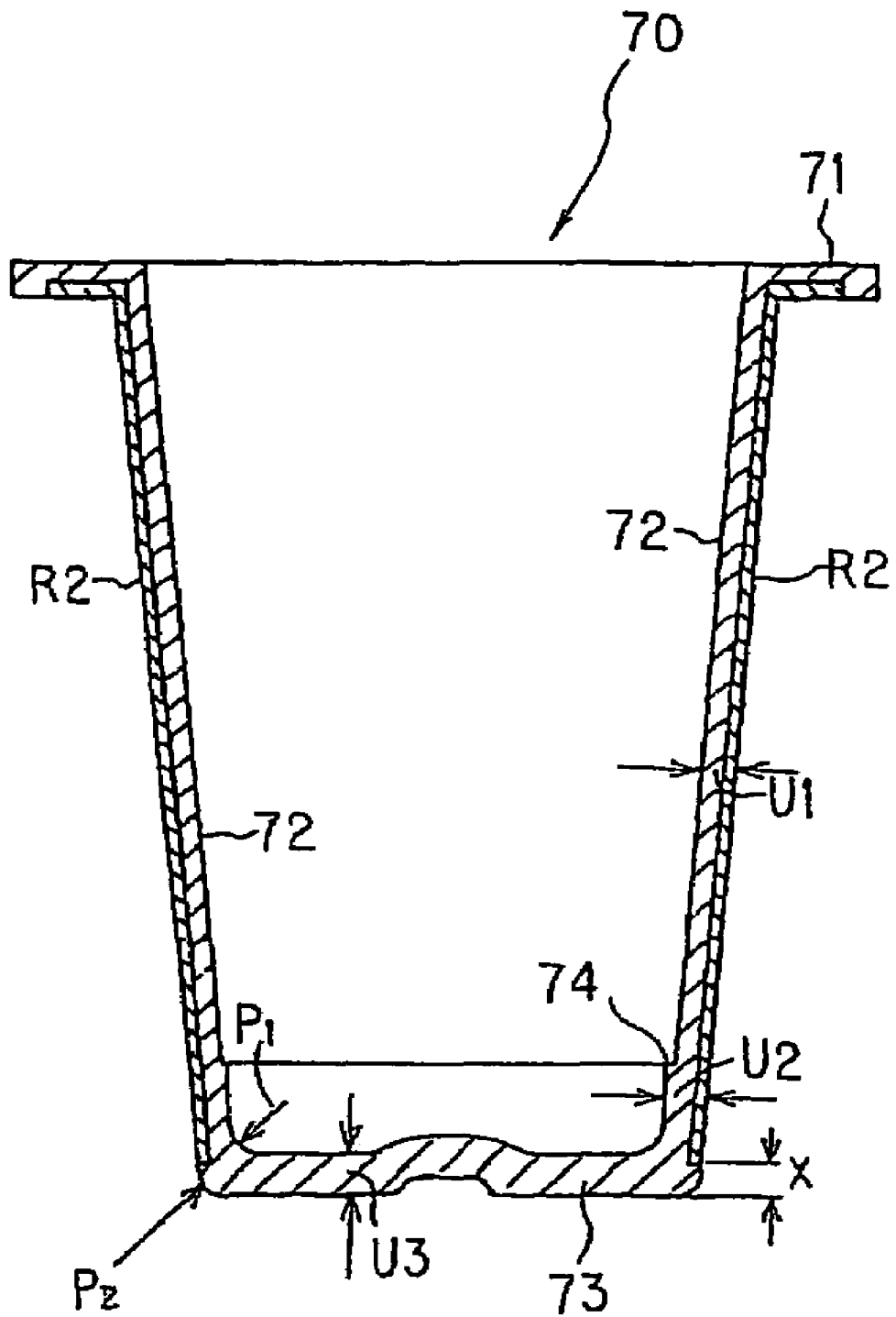
FIG. 7 shows a sectional view of the inmold labeled type plastic container according to the invention in the absence of a bottom rim.

Although a bottom rim (30 or 64) is formed in every one the inmold labeled type plastic containers described above, the bottom rim is not necessarily indispensable, but a form shown in FIG. 7 is also acceptable.

An inmold labeled type plastic container 70 shown in FIG. 7 comprises a flange part 71, a side wall part 72 hanging from the flange part 71 and a bottom part 73 continuous to the side wall part 72. Further the outer bottom face of the bottom part 73 constitutes a grounding face. Further, an annular stacking rib 74 erecting from the bottom part 73 of the container is disposed on the inner circumferential face of the side wall part 72. To describe in further detail the configuration of the corner parts of the container bottom with respect to the above-described inmold labeled type plastic container 70 according to the invention, the thickness of the side wall part 72 in the vicinity of the upper part of the annular stacking rib 74 being represented by U1, the thickness of the side wall part 72 between the bottom part 73 and the annular stacking rib 74 being represented by U2 and further the thickness of the bottom part 73 being represented by U3, it is preferable that they have a relationship of U3>U2>U1. Further in the most desirable mode of the invention, it is preferable for them to have relationships of U3=U1+0.4 mm and U2=U1+0.2 mm. In the container 70, regarding the configuration of the corner parts of the container bottom, it is preferable for the curve of the inner face P1 of the intersection between the bottom part 73 and the side wall part 72 to have its radius r1 in a range of 1.5 U1 to 3 U1 and the curve of the outer face P2 of the intersection between the bottom part 73 and the side wall part 72 to have its radius r2 in a range of 1/2 U3 to 1/4 U3. Further, in more specific terms, in the most desirable mode of the invention, it is preferable for the curve of the inner face P1 to have its radius r1 in a range around 2.0 U1, from 1.7 U1 to 2.3 U1 and the curve of the outer face P2 to have its radius r2 in a range around 1/3 U3. In the foregoing, U1, U2 and U3 are in mm units.

In the foregoing, by adjusting the thickness U1 of the side wall part 72 in the vicinity of the upper part of the annular stacking rib 74, the thickness U2 of the side wall part 72 between the bottom part 73 and the annular stacking rib 74, and the thickness U3 of the bottom part 73 as described above, namely by increasing the thickness of the side wall part 72 toward the bottom and giving a greater thickness to the bottom part than the thickness of the side wall part, the drop strength of the inmold labeled type plastic container according to the invention is increased. Further by adjusting the radius r1 of the curve of the inner face P1 of the intersection between the bottom part 73 and the side wall part 72 and the radius r2 of the curve of the outer face P2 of the intersection between the bottom part 73 and the side wall part 72, namely by making curvilinear the inner face P1 of the intersection between the bottom part 73 and the side wall part 72 and the outer face P2 of the intersection between the bottom part 73 and the sidewall part 72 and keeping smaller the radius r1 of the curve of the inner face P1 of the intersection between the bottom part 73 and the side wall part 72 to increase the thickness of the inner face P1 part, together with the adjustment of the thickness U1 of the side wall part 72 in the vicinity of the upper part of the annular stacking rib 74, the thickness U2 of the side wall part 72 between the bottom part 73 and the annular stacking rib 74 and the thickness U3 of the bottom part 73, the drop strength of the inmold labeled type plastic container according to the invention is further enhanced. In the foregoing, if the radius r1 of the curve of the inner face P1 of the intersection between the bottom part 73 and the side wall part 72 surpasses 3 U1, dents in the molded resin of the bottom part will become too great, which is undesirable; or if it is less than 1.5 U1, it will become difficult to keep its strength, which also is undesirable. Further in the foregoing, if the radius r2 of the curve of the outer face P2 of the intersection between the bottom part 73 and the side wall part 72 is less than 1/4 U3, the bottom part of the container will become close to an angular face to the curve, which could trigger cracking when the container is dropped and would be undesirable. Or if it surpasses 1/2 U3, it will become easier for the molded resin to flow toward the outer face of the label at the time of injection molding, and this again is undesirable. In the foregoing, r1 and r2 are in mm units.

To add, it is preferable to use the aforementioned laminated label as the label in this case, and the preferable position in which the label R1 is to be disposed is a gap configured as a gap X in a range of 0<X<1/2 U3 between the bottom face constituting the grounding face of the bottom part 73 of the container and the bottom end of the label R2 disposed on the outer wall face of the side wall part 72 as shown in FIG. 7; in more specific terms, the most desirable form is around X=1/3 U3. In the foregoing, if X surpasses 0, namely if the label becomes longer that the bottom face of the bottom part, the label will be rolled onto that bottom face from the bottom part and tend to become wrinkled, which is not undesirable, or if X surpasses 1/2 U3, namely if the length of the bottom end of the label decreases, it will become easier for the molded resin to flow toward the outer face of the label at the time of injection molding, and this also is undesirable. In the foregoing, X is in mm units.

According to the invention so far described, an inmold labeled type plastic container excelling in aesthetic design and whose label is prevented from being peeled off or rolling onto the surface side of the label (between the inner surface of the female mold and the label) can be provided.

EXAMPLES

The present invention will be described in further detail with reference to examples thereof.

Example 1

As the resin for the plastic container body, HDPE (M.F.R.: 40 g/10 min) was used (resin temperature: 220° C.); this resin and a label of 90 μm in thickness were integrally molded by the molding method for inmold labeled type plastic containers illustrated in FIG. 1 to fabricate an inmold labeled type plastic container of Embodiment 1, and it was filled with a content.

Details of the parts of the inmold labeled type plastic container of this Embodiment 1 including the dimensions are as follows:

Dimension of the bottom rim: 0.9 mm

Thickness of the intersection between the bottom rim and the container's bottom part: 1.0 mm Thickness of the container's bottom part: 1.1 mm Thickness of the container's side part: 0.77 mm Flange width: 4.0 mm Flange thickness: 1.0 mm Relationship between the fluid length (L) of the injected molten resin and the average wall thickness (t) of the container (L/t): About 175

Configuration of the label: oriented polypropylene (30 μm), adhesive, polyethylene terephthalate (printing base) (12 μm), adhesive, aluminum foil (barrier layer) (7 μm), adhesive, polypropylene (heat seal layer) (30 μm)

Configuration of the lid member: Aluminum foil (45 μm), sealant film (30 μm).

Overall height of the container: 110 mm
Capacity of the container: 300 cc
Content: Coffee-flavored milk
Volume of the content: 240 cc (the content was sterilized with a mist of hydrogen peroxide before the container was filled with it, and the inside of the container was dried).

The inmold labeled type plastic container of Embodiment 1 was found to be a plastic container excelling in aesthetic design, whose label is prevented from being peeled off or wrinkled. When a container similar to Embodiment 1 by using a label whose dimensions involved more errors than the side part label used in Embodiment 1, a plastic container excelling in aesthetic design, whose label was prevented from being peeled off or wrinkled, was successfully obtained.

The inmold labeled type plastic container of Embodiment 1, excelling in suitability for being filled with and packaging the content, suitability for distribution, preservability and other respects, was not destroyed when it was dropped five times from a height of 50 cm, and found excelling in light interception and, moreover in respects of permeation of oxygen and permeation of humidity.

Example 2

As the injected resin material for the plastic container body, polypropylene was used and, as the label material a film formed by stacking three layers of polyethylene terephthalate film (12 μm)/aluminum foil (15 μm)/polypropylene film (60 μm) was used. This label material, after characters and pictures were printed on the PET film as the thin layer positioned on its front (outermost) side and the aluminum foil as the barrier layer was laminated by using an adhesive, was formed into a three-layered film with the polypropylene film as the thin layer positioned on its rear (innermost) side being laminated by using an adhesive, and punched into prescribed shapes (a fan shape for the side label and a round having a gate hole at the center for the bottom label).

Then, as shown in FIG. 1, these labels (the side label R1 and the bottom label R2) were arranged on the side face and the bottom face of the female mold 2 and, after the male mold 1 was pressed in from above, the resin 6 was injected into the cavity through the gate 4 to perform usual injection molding of inmold labels.

Measuring the barriering performance of the molded container thereby obtained gave the values of oxygen permeability and water vapor permeability shown in Table 1.

Since the innermost layer of this label material is the same material as the resin of the container body, the label material and the container body can be integrated without using an adhesive.

To add, while using polypropylene as the injected resin material to constitute the container body, a film of the following laminated configuration of the following layers, from the outermost to the innermost, was used as the label material in addition to the above.

(1) Stretch polypropylene film (printing base) (30 μm)/aluminum foil (barrier layer) (15 μm)/oriented polypropylene film having a heat seal layer (adhesive layer) (30 μm);

(2) Stretch polypropylene film (printing base) (30 μm)/polyethylen terephthalate film on which silicon oxide is vapor-deposited (barrier layer) (12 μm)/oriented polypropylene film having a heat seal layer (adhesive layer) (30 μm);

(3) Unoriented polypropylene film (30 μm)/polyethylene terephthalate film (printing base) (12 μm)/polyvinylidene chloride film (barrier layer) (30 μm)/unoriented polypropylene film (adhesive layer) (30 μm);

(4) Stretch polypropylene film (30 μm)/polyethylene terephthalate film (printing base) (12 μm)/polyethylene terephthalate film on which silicon oxide is vapor-deposited (barrier layer) (12 μm) /oriented polypropylene film having a heat seal layer (adhesive layer) (30 μm); and (5) Unoriented polypropylene film (30 μm)/polyethylene terephthalate film (printing base) (12 μm)/aluminum foil (barrier layer) (9 μm)/polyethylene terephthalate film (12 μm)/unbriented polypropylene film (adhesive layer) (30 μm).

TABLE 1

| Barrier layer | Oxygen permeability (cc/pkg · day · atm) * | Water vapor permeability (g/pkg · day) * |
|---|---|---|
| PET with silicon oxide vapor-deposited thereon | 0.07 | 0.0041 |
| Polyvinylidene chloride film | 0.08 | 0.0043 |
| Aluminum foil | 0.06 | 0.00088 |
| None | 6.70 | 0.01 |

* Measuring methods:
For oxygen permeability 23° C. in temperature, 90% RH in humidity, purged for 3 days; MOCON's Oxtran used
For water vapor permeability Calcium chloride weight method, measured for 6 days; 40° C. in temperature, 90% RH in humidity Generally, when a label material is to be arranged on the side face and the bottom face of the female mold 3 after it is punched into a prescribed shape, the extent of curling of the label material affects the yield of injection molding. Namely, the smaller the curling of the label material, the higher the yield.

To reduce the curling of the label material, it is desirable to configure the laminated structure of the label material in a symmetrical pattern centering on the central layer.

In the label material having the configuration of (1), (2) and (5) layers, it is possible to configure the laminated structure in a symmetrical pattern centering on the central layer, and the label material of (3) and (4) can also be considered to have a symmetrical laminated structure if the polyethylene terephthalate film and the polyethylene terephthalate film on which silicon oxide is vapor-deposited are considered a single polyethylene terephthalate film. For this reason, the curling of the label material was successfully reduced at the time of punching. Where the label material having the configuration of (1) through (5) layers was used, both the gas barriering characteristic and the tight adhesiveness to the injected resin were satisfactory.

Example 3

A face of a biaxially oriented polypropylene film of 30 μm in thickness was coated with a polyurethane adhesive to a thickness of 4 g/m² (in a dry state) to form an adhesive layer, and a biaxially oriented polyethylene terephthalate film of 12 μm in thickness, on one face of which a prescribed print pattern was printed to form a printed layer was dry-laminated over a face of the adhesive layer. Next, a face of this biaxially oriented polyethylene terephthalate film was coated with a polyurethane adhesive to a thickness of 4 g/m² (in a dry state) in the same way as above to form an adhesive layer, and further a biaxially oriented polyethylene terephthalate film on which silicon oxide of 12 μm in thickness was vapor-deposited was dry-laminated on a face of the adhesive layer. After that, the face of the biaxially oriented polyethylene terephthalate film on which silicon oxide was vapor-deposited was coated with a polyurethane adhesive to a thickness of 4 g/m² (in a dry state) in the same way as above to form an adhesive layer, and then a biaxially oriented film of 30 μm in thickness, mainly consisting of polypropylene and having a heat seal layer, was dry-laminated over a face of the adhesive layer to fabricate a laminated material for label formation. By using this laminated material for label formation, a label for the outer circumferential face to be tightly adhered to the whole outer wall face of the circumferential side wall part constituting an injection molded container of prescribed dimensions and similarly a label for the bottom face (perforated label) to be tightly adhered to the whole outer wall face of the bottom wall part constituting the injection molded container were fabricated by punching. Next, the label for the outer circumferential face and the label for the bottom face fabricated as described above were so fitted to the inner wall face of the metal mold that its biaxially oriented film face having the heat sealing function comes into contact with the molded resin while vacuum-sucking to fix it by utilizing a vacuum suction device or the like. Then the male metal mold was fixed to the female metal mold; after that polypropylene resin melted by a heating cylinder was injected from a gate opening by way of a runner into a space formed by the female metal mold and the male metal mold to form a container matching the shape of the space between the metal molds; at the same time, the label was closely adhered to the outer wall face of the circumferential side wall part of the barrel constituting that container and the outer wall face of the bottom wall part by melting integration, followed by cooling and hardening, and the molded product was taken out to fabricate an inmold labeled injection molded container for retort food according to the invention (see FIG. 6). Incidentally, the capacity of the container was 320 cc, and the flange part constituting the injection molded container was disposed with a downward inclination of 3° to the horizontal line of the opening. The inmold labeled injection molded container for retort food fabricated as described above was filled through its opening with curry roux (290 g) as the content to fill it into a package; after that, over its opening, a biaxially oriented polyethylene terephthalate film whose internal face consisted of an unoriented polypropylene resin film having a heat sealing function and, over which silicon oxide was further vapor-deposited as a barriering base, was stacked; it was further sealed with a lid member formed by stacking a biaxially oriented polyethylene terephthalate film of 12 μm in thickness as the base film to fabricate a sealed packaged product. Next, the sealed packaged product was put into a retort boiler to undergo retort processing (sterilization with heat) under retorting conditions of 120° C. in temperature, 2.1 Kgf/cm² in pressure and 30 minutes in duration to fabricate a packaged product having gone through retort processing. The packaged product having gone through retort processing manifested no deformation of the container body or any other detect, and was found excelling in packaging suitability, retorting suitability, distribution suitability, preservative suitability and other respects. The packaging container constituting this packaged product was not destroyed when it was dropped five times from a height of 50 cm, and found excelling in oxygen permeability and humidity permeability among other properties. The curry roux which was heated for two minutes in a 500 W microwave oven after the lid material of the packaged product was peeled off became just hot enough to eat, suffering no deformation of the container or any other trouble. Incidentally, in the injection molded container, T1 (Ta) was 0.95 mm, T1, 1.0 mm, T2, 1.1 mm, T3, 1.2 mm, and r1, 0.5 mm.

Example 4

By using a similar container to what was used in Embodiment 3, the container was filled with 310 cc of tomato paste as its content, and sealed with the lid member over the opening. This container was subjected to boiling sterilization at 95° C. for 60 minutes to provide a boil-treated package product. This boil-treated package product manifested no deformation of the container body or any other detect, and was found excelling in packaging suitability, retorting suitability, distribution suitability, preservative suitability and other respects. The packaging container constituting this packaged product was not destroyed when it was dropped five times from a height of 50 cm, and found excelling in oxygen permeability and humidity permeability among other properties. The tomato paste which was heated for one minute in a 500 W microwave oven after the lid material of the packaged product was peeled off became just hot enough to eat, suffering no deformation of the container,or any other trouble, and the container was thus found also excellent for use involving boiling.

The invention claimed is:

1. An inmold labeled plastic container, fabricated by an inmold labeling fabricating method by which molding of the container and labeling are accomplished at the same time by fitting an inmold label into a gap, and injecting molten resin into said gap, said gap being formed by using a female metal mold and a male metal mold and by joining said female mold and male mold, wherein the flange width (y') is a width between the inner end of the flange part which is located at a lower side of the flange part and the outer end of flange part formed by the female mold, and the flange width (y) is a width between the inner end of the flange part which is located at a lower side of the flange part and the outer end of flange part formed by the male mold, wherein the flange width (y') is a width between the inner end of the flange part which is located at lower side of the flange part and the outer end of flange part formed by the female mold, and the flange width (y) is a width between the inner end of the flange part which is located at lower side of the flange part and the outer end of flange part formed by the male mold.

2. The inmold labeled plastic container according to claim 1, wherein the thickness of said label is not more than 150 μm.

3. The inmold labeled plastic container according to claim 1, wherein the label is a label having a configuration in which a plurality of thin films are stacked, the thin film positioned on the front face and the thin film positioned on the rear face consist of thin films of the same material, and further at least a resin film layer and a barrier layer having a defined strength or barrier layers having a defined strength are stacked between these thin films.

4. The inmold labeled plastic container according to claim 3, wherein the thin film positioned on the front face and the thin film positioned on the rear face of said label consist of biaxially oriented polypropylene resin film layers or polyethylene resin film layers, said resin film layers having a defined strength consist of biaxially oriented polyethylene terephthalate film layers, biaxially oriented polyamide film layers or biaxially oriented polypropylene film layers, and the barrier layers consist of metal foil layers, vapor-deposited metal film layers or inorganic vapor-deposited oxide film layers.

5. The inmold labeled plastic container according to claim 1, wherein the relationship between the fluid length (L) of the injected molten resin and the average wall thickness (t) of the container is:

$$L/t < 250.$$

6. The inmold labeled plastic container according to claim 1, wherein a bottom rim is formed in the bottom part of the container, with a dimension of not less than 0.3 mm but not more than 20 mm, and the bottom rim is labeled in a similar way to the side part of the container.

7. The inmold labeled plastic container according claim 6, wherein the relationships among the wall thickness (A) of the intersection between said bottom rim and the bottom part of the container, the wall thickness (B) of the bottom part of the container and the wall thickness (C) of the side part of the container are:

$$A \leqq 2 \times B \text{ and}$$

$$A \leqq 2 \times C.$$

* * * * *